United States Patent [19]
Brown et al.

[11] Patent Number: 5,872,892
[45] Date of Patent: Feb. 16, 1999

[54] PROCESS AND APPARATUS FOR IMPARTING LINEAR MOTION TO TOOLING ATTACHED TO THE END OF A MANIPULATOR DEVICE HAVING TWO DIFFERENT LENGTH ARMS

[75] Inventors: James Vaughn Brown, Amelia; David K. Kuhl, Cincinnati; Michael J. Ondrasek, Centerville, all of Ohio

[73] Assignee: Motoman, Inc., West Carrollton, Ohio

[21] Appl. No.: 794,339

[22] Filed: Feb. 3, 1997

[51] Int. Cl.[6] .............................. G05B 15/00; G05B 19/00

[52] U.S. Cl. ................................ 395/80; 395/87; 395/97; 901/2; 901/14; 901/15

[58] Field of Search .................................. 901/15, 2, 14; 395/80, 87, 97

[56] References Cited

U.S. PATENT DOCUMENTS

| | | | |
|---|---|---|---|
| 4,897,015 | 1/1990 | Abbe et al. | 414/744.8 |
| 5,046,992 | 9/1991 | Tamai et al. | 474/84 |
| 5,106,258 | 4/1992 | Orii | 414/733 |
| 5,222,409 | 6/1993 | Dalakian | 74/479.01 |
| 5,379,367 | 1/1995 | Song | 395/87 |

Primary Examiner—Allen R. MacDonald
Assistant Examiner—Jason W. Rhodes
Attorney, Agent, or Firm—Killworth, Gottman, Hagan & Schaeff LLP

[57] ABSTRACT

A process and apparatus is provided for imparting linear motion to tooling. The tooling is attached to a manipulator device having two different length arms. The tooling may be moved linearly from a first point to a second point by adjusting the angles of the first and second arms for a number of intermediate points extending along a straight line between the first and second points and along which the tooling passes.

11 Claims, 9 Drawing Sheets

PROCESS AND APPARATUS FOR IMPARTING LINEAR MOTION TO TOOLING ATTACHED TO THE END OF A MANIPULATOR DEVICE HAVING TWO DIFFERENT LENGTH ARMS

CROSS-REFERENCES TO RELATED APPLICATIONS

This application is related to commonly assigned application U.S. Ser. No. 08/794,007 filed Feb. 3, 1997, entitled "TWO AXIS MANIPULATOR ARM", by Kuhl et al., and is herein incorporated by reference.

BACKGROUND OF THE INVENTION

The present invention relates to robotic manipulator devices for effecting motion of associated tooling from one position to another. More specifically, the present invention relates to a process and apparatus for imparting linear motion of associated tooling from one position to another.

Robotic manipulator devices are used in industry to perform operations such as welding, assembling parts, material handling, deburring, palletizing, and the like. Typically, the robotic manipulator devices perform the above operations repetitively on a number of identical workpieces. Various types of tooling are coupled to the end of the manipulator devices to perform the desired operations described above.

Robotic manipulator devices having first and second arms of equal lengths are known in the art. Pivotable movement of the first arm is effected by a first motor and pivotable movement of the second arm, which is pivotally connected to the first arm, is effected by a second motor. A tool or workpiece holder is coupled to the distal end of the second arm. Oftentimes it is desirable to move the tool or workpiece holder along a linear path. For example, it may be required to move a workpiece along a straight-line path to load it within a workpiece holder. Movement of the tool or workpiece along a linear path can typically be accomplished by driving the two motors at generally the same speed, assuming the gearing used to transfer rotational motion from the first motor to the first arm is of the same ratio as the gearing used to transfer rotational motion from the second motor to the second arm.

Such a manipulator is oftentimes sufficient for performing most functions. However, if the manipulator is intended to be used in a work space or an enclosure having a vertical dimension which differs substantially from a horizontal dimension, it may contact one of the walls defining the work space or the enclosure as it moves to either its retracted-most position or its extended-most position. For example, if the enclosure has a horizontal dimension which is greater than the vertical dimension, the first arm may contact the uppermost wall of the enclosure when the device is moved to its retracted-most position.

It would be desirable to have a robotic manipulator device comprising first and second arms which is capable of moving within an enclosure having a horizontal dimension which differs from the vertical dimension and which is capable of moving along a straight-line path.

SUMMARY OF THE INVENTION

The present invention meets the aforementioned needs by providing a process and apparatus which is capable of moving within an enclosure having a horizontal dimension which differs from the vertical dimension and which is capable of moving along a straight-line path.

According to a first aspect of the present invention, an apparatus is provided for imparting linear motion to tooling. The apparatus comprises a base, a first arm, a second arm, a drive mechanism and a processor. A first end of the first arm is pivotally coupled to the base so as to rotate about a first axis. A first end of the second arm is pivotally coupled to a second end of the first arm so as to rotate about a second axis. The second end of the second arm is coupled to the tooling. The first arm has a first length and the second arm has a second length which differs from the first length. The drive mechanism imparts rotary motion to the first and second arms. The processor controls the drive mechanism so as to move the tooling substantially linearly from a first point to a second point.

Preferably, the drive mechanism comprises a first motor for imparting rotary motion to the first arm and a second motor for imparting rotary motion to the second arm.

The apparatus further comprises a cabling system coupled to the first and second arms so that the tooling is maintained in a first angular position regardless of movement of the first and second arms.

The processor is programmed to control the first motor so as to adjust a first angular position of the first arm with respect to a first axis of a two axis coordinate system. The processor is further programmed to control the second motor so as to adjust a second angular position of the second arm with respect to the first arm.

DETAILED DESCRIPTION OF THE PREFERRED EMBODIMENTS

Figure 1:
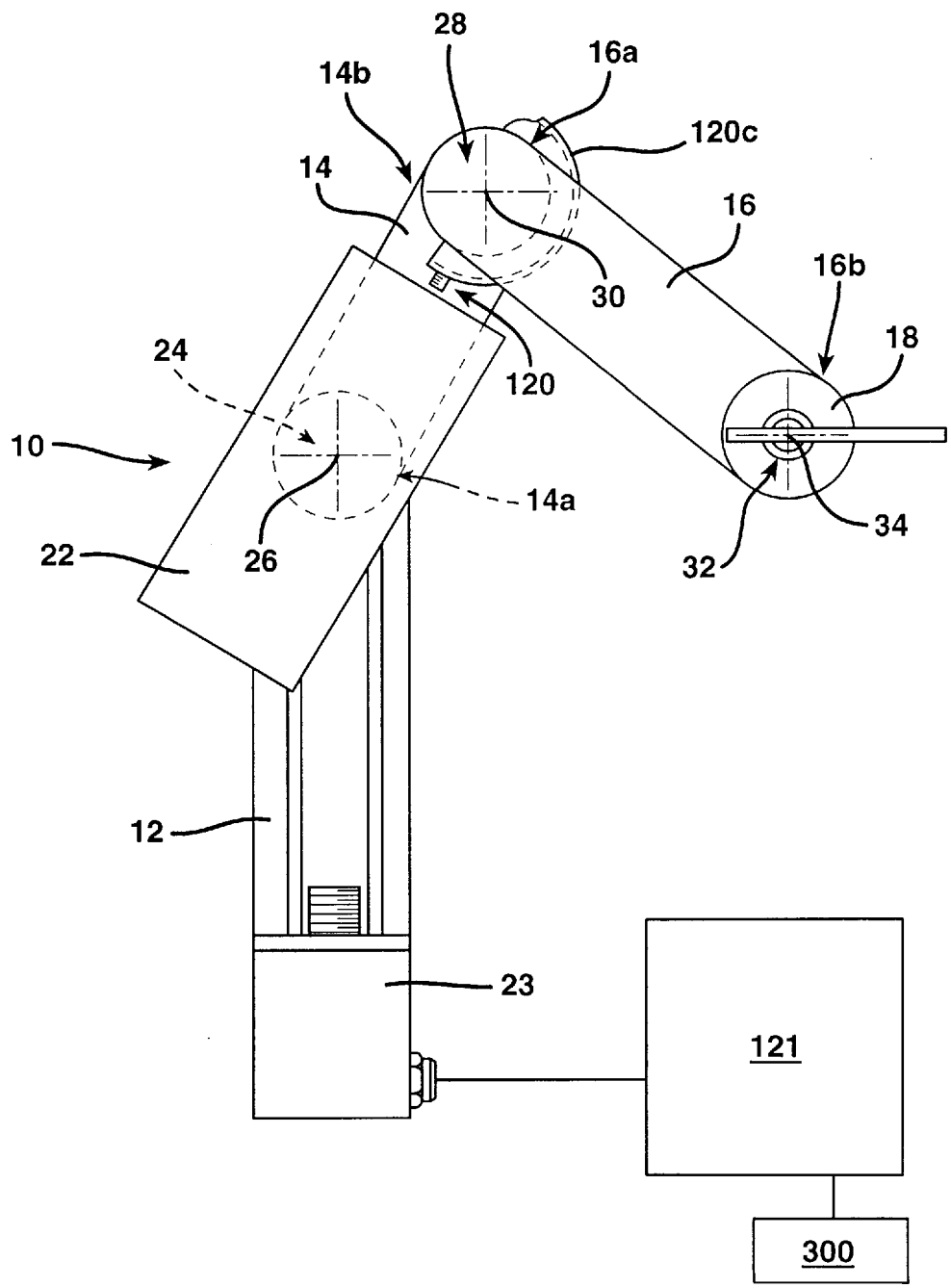
FIG. 1 is a side elevational view of a manipulator arm according to the present invention.
Figure 2:
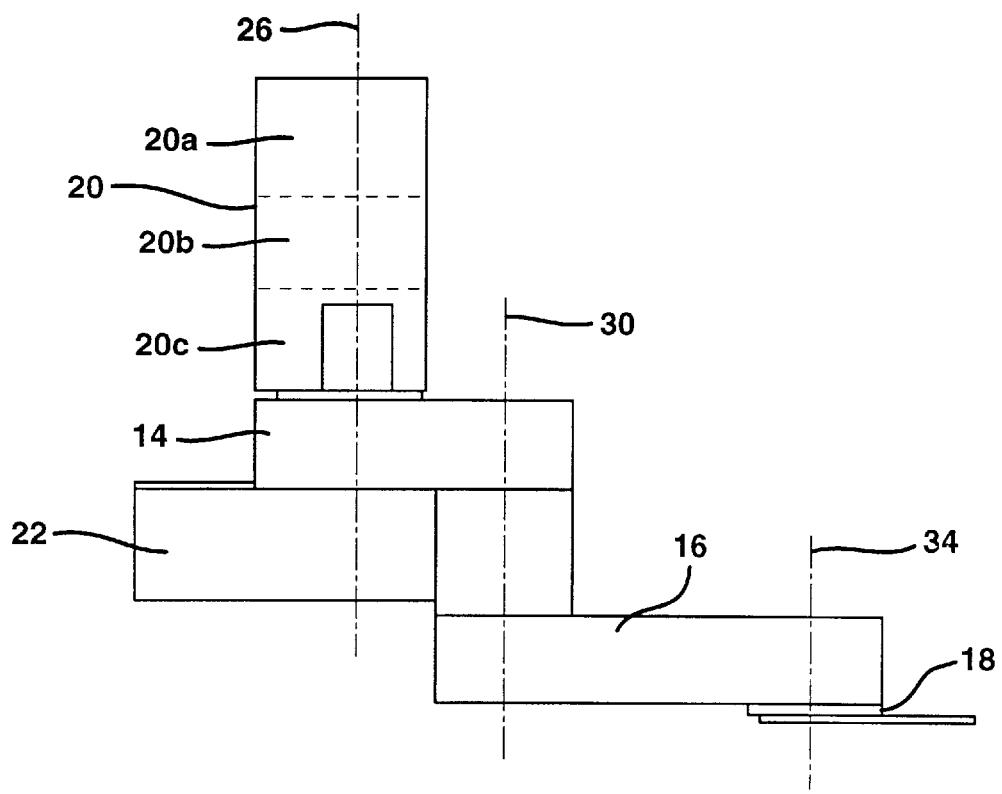
FIG. 2 is a plan view of the manipulator arm of FIG. 1.

Referring now to FIGS. 1 and 2, a manipulator device 10 is shown. The manipulator device 10 comprises a base 12, a first or upper arm 14, a second or lower arm 16, a workpiece holder or wrist 18, and a drive mechanism 19. The drive mechanism 19 includes a first motor 20 and a second motor 22. The base 12 includes an interface module 23 having various electrical, vacuum and air connections. A first end 14a of the upper arm 14 is pivotally coupled to the base 12 by a first or shoulder pivot 24. Rotation of the upper arm 14 about a first axis 26 defines a shoulder joint as the upper arm 12 rotates about the shoulder pivot 24 in a vertical plane. A first end 16a of the lower arm 16 is pivotally coupled to a second end 14b of the upper arm 14 by an elbow pivot 28. Rotation of the lower arm 16 about a second axis 30 defines an elbow joint as the lower arm 16 rotates about the elbow pivot 28 in the vertical plane. A second end 16b of the lower arm 16 is pivotally coupled to the wrist or workpiece holder 18 by a wrist pivot 32. Rotation of the wrist 18 about a third axis 34 defines a wrist joint as the wrist 18 rotates about the wrist pivot 32 in the vertical plane.

The first motor 20 is mounted to the base 12 and coupled to the upper arm 14. The base 12 is bolted or otherwise fixed to a stationary structure, such as a platform, table or floor. The first motor 20 is bolted or otherwise fixed to the base 12 such that the first motor 20 is immovably fixed to the base 12. The first motor 20 imparts rotary motion to the upper arm 14 about the first axis 26. In the illustrated embodiment of FIG. 3, the first motor 20 comprises a coupler 35 and a first drive shaft 36 generally aligned along the first axis 26. The upper arm 14 comprises a first main shaft assembly 38 positioned at the first end 14a of the upper arm 14. The first motor 20 is bolted or otherwise fixed to a coupling housing 40. The upper arm 14 rotates about the first axis 26 with respect to the coupling housing 40 and the first motor 20 which remain fixed relative to one another and the base 12. Since the base 12 is fixed to a stationary object, the base 12 is considered a ground reference.

The first main shaft assembly 38 comprises a second drive shaft 42. The first drive shaft 36 of the first motor 20 is coupled to the second drive shaft 42 of the first main shaft assembly 38 through the coupler 35. In the illustrated embodiment, the first motor 20 is axially aligned with the first main shaft assembly 38 such that rotation of the first drive shaft 36 about the first axis 26 effectuates rotation of the second drive shaft 42 about the first axis 26, and hence, rotation of the upper arm 14 about the first axis 26. The coupler 35 permits rotation of the drive shafts 36, 42 relative to one another without the necessity that the drive shafts 36, 42 be perfectly aligned. It will be appreciated by those skilled in the art that the first motor 20 may be positioned at an angle with respect to the second drive shaft 42 and, with appropriate gearing, effectuate rotation of the upper arm 14 about the first axis 26.

Rotation of the second drive shaft 42 effectuates rotation of the upper arm 14 through a first harmonic gear reducer assembly 44 of the first main shaft assembly 38. The first harmonic gear reducer assembly 44 comprises a circular spline 46, a flexspline 48 and a wave generator 50. Such a harmonic gear reducer assembly is commercially available from HD Systems, Inc. under the product designation CSF-20-100. In the illustrated embodiment, the circular spline 46 is bolted or otherwise secured to the upper arm 14 through fasteners 52 (only one shown) so that the circular spline 46 rotates with the upper arm 14. The flexspline 48 is fixed to the coupling housing 40 and the base 12 such that it does not rotate. The wave generator 50 is coupled to and rotates with the second drive shaft 42.

The circular spline 46 is a cylindrical, non-flexible, thick-walled, rigid ring with internal spline teeth. The flexspline 48 is a cylindrical, flexible, thin-walled, non-rigid ring with external spline teeth. The flexspline 48 has a more narrow circumference and a few less teeth than the circular spline 46. The wave generator 50 is an elliptically shaped cam enclosed in an anti-friction ball bearing assembly 53. The wave generator 50 is inserted into the bore of the flexspline 48 which is inserted into the bore of the circular spline 46. The elliptical shape of the wave generator 50 is transferred to the flexspline 48, causing the external teeth of the flexspline 48 to engage with the internal teeth of the circular spline 46 at two equally spaced areas 180 degrees apart on their respective circumferences, i.e. at the points of the elliptical major-axis intersections. A positive gear mesh is created at these points of engagement. Further, there is total disengagement of the teeth at the minor axis of the ellipse.

The different number of teeth on the circular spline 46 and the flexspline 48 causes one of them to rotate with respect to the other as the wave generator 50 rotates. The rotation of the circular spline 46 is very slow as compared with the rotation of the wave generator 50. For example, a typical circular spline may have 202 teeth while the typical flexspline may have 200 teeth. Such a configuration leads to a 100:1 gear reduction as the circular spline 46 rotates two teeth for every revolution of the wave generator 50. In short, as the wave generator 50 rotates and flexes the thin-walled flexspline 48, there is a rotating wave motion as the teeth on the flexspline 48 and circular spline 46 move in and out of engagement. A circular motion ensues as long as the flexspline 48 or the circular spline 46 is fixed in place. It should be noted that the circular spline 46 rotates in a direction opposite that of the wave generator 50.

The second motor 22 is mounted to the upper arm 14 and coupled to the lower arm 16. The second motor 22 is immovably fixed to the upper arm 14 such that it rotates along with the upper arm 14. The second motor 22 imparts rotary motion to the lower arm 16 about the second axis 30. According to the illustrated embodiment of FIG. 3, the second motor 22 comprises a third drive shaft 54 and a right angle drive assembly 56 having a fourth drive shaft 58. The lower arm 16 comprises a second main shaft drive assembly 60 positioned at a second end 14b of the upper arm 14 and a first end 16a of the lower arm 16. The second main shaft drive assembly 60 comprises a fifth drive shaft 62 which is aligned with the second axis 30.

The second motor 22 imparts rotary motion to the lower arm 16 via the right angle drive assembly 56 and the second main shaft drive assembly 60. The third drive shaft 54 is coupled to a first gear 56a of the right angle drive assembly 56 and rotates about a third axis 64. The third axis 64 is orthogonal to the second axis 30. The first gear 56a corresponds to and engages a second gear 56b of the right angle drive assembly 56. The second gear 56b is coupled to the fourth drive shaft 58 and rotates about a fourth axis 66 which is substantially parallel to the second axis 30. The first and second gears 56a, 56b form a spiral bevel gear and transfer the rotary motion of the third drive shaft 54 ninety degrees to the fourth drive shaft 58.

The rotary motion of the fourth drive shaft 58 is transferred to the fifth drive shaft 62 via a belt drive assembly 68. The belt drive assembly 68 comprises a first belt pulley 70 coupled to the fourth drive shaft 58, a second belt pulley 72 coupled to the fifth drive shaft 62 and a drive belt 74 operatively engaged to the first and second belt pulleys 70, 72. The rotary motion of the third drive shaft 54 is transferred to the fourth drive shaft 58 via the right angle drive assembly 56. The rotary motion of the fourth drive shaft 58 about the fourth axis 66 is transferred to the fifth drive shaft 62 and the second axis 30 via the belt drive assembly 68. As the fourth drive shaft 58 rotates, the drive belt 74 rotates effectuating rotation of the fifth drive shaft 62. Rotation of the fifth drive shaft 62 effectuates rotation of the lower arm 16 about the second axis 30.

Rotation of the fifth drive shaft 62 effectuates rotation of the lower arm 16 through a second harmonic gear reducer assembly 76 of the second main shaft assembly 60. The second harmonic gear reducer assembly 76 comprises a circular spline 78, a flexspline 80 and a wave generator 82. The second harmonic gear reducer assembly 76 operates in the same manner as the first harmonic gear reducer assembly 44 except the circular spline 78 is fixed and the flexspline 80 rotates. The circular spline 78 is fixed to the upper arm 14 by fasteners (not shown). The wave generator 82 is coupled to and rotates with the fifth drive shaft 62. As the wave generator 82 rotates, the flexspline 80 rotates with respect to the fixed circular spline 78 thereby rotating the lower arm 16 to which the flexspline 80 is fixed. Rotation of the flexspline 80 is very slow as compared with the wave generator 82. In the illustrated embodiment, there is a 100:1 gear reduction in the first harmonic gear reducer assembly 44 and an 80:1 gear reduction in the second harmonic gear reducer assembly 76. It will be appreciated by those skilled in the art that the gear reduction of the first and second harmonic gear reducer assemblies may be set to any reasonable level.

Figure 3:
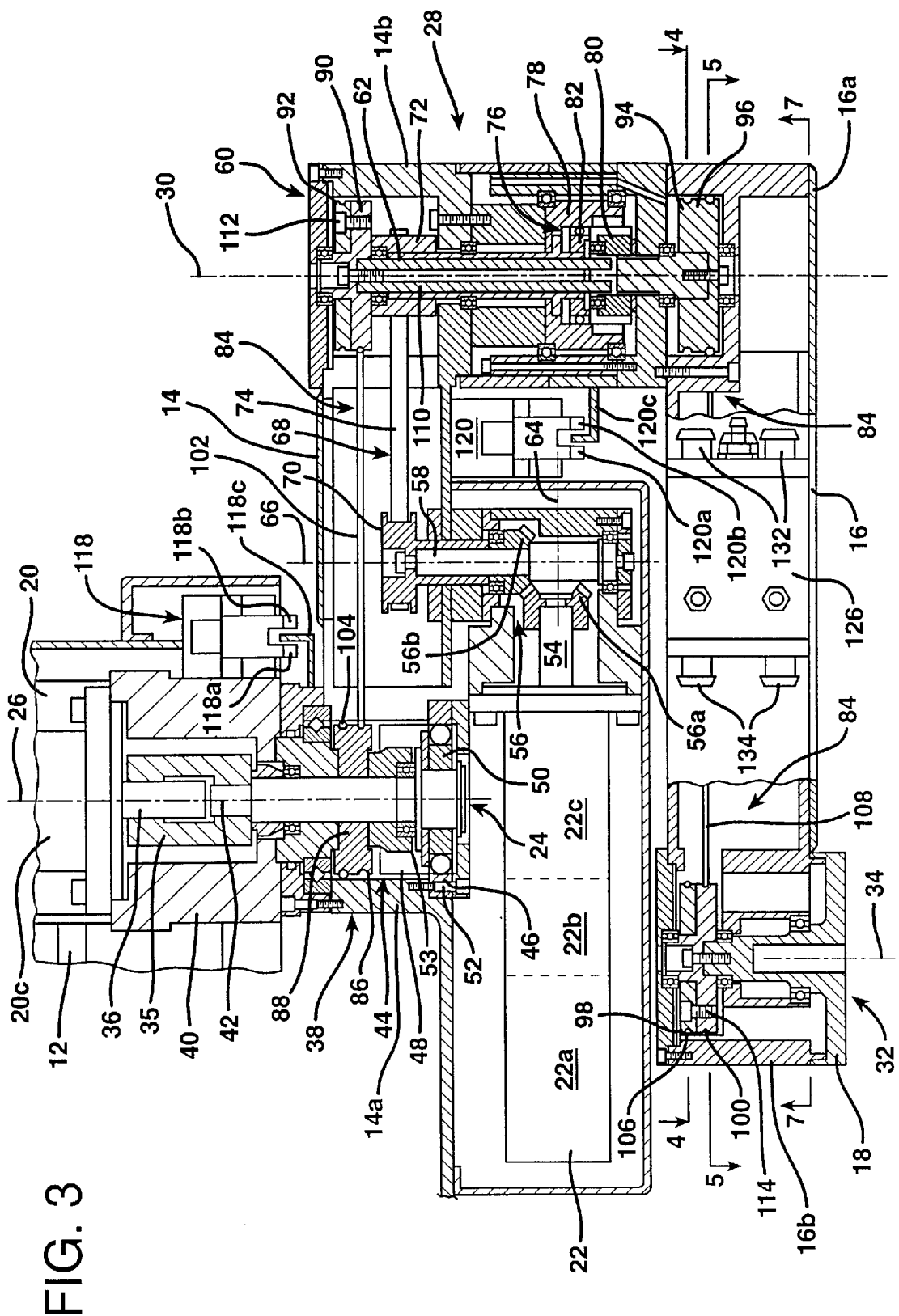
FIG. 3 is a sectional plan view of the manipulator arm of FIG. 1.
Figure 6:
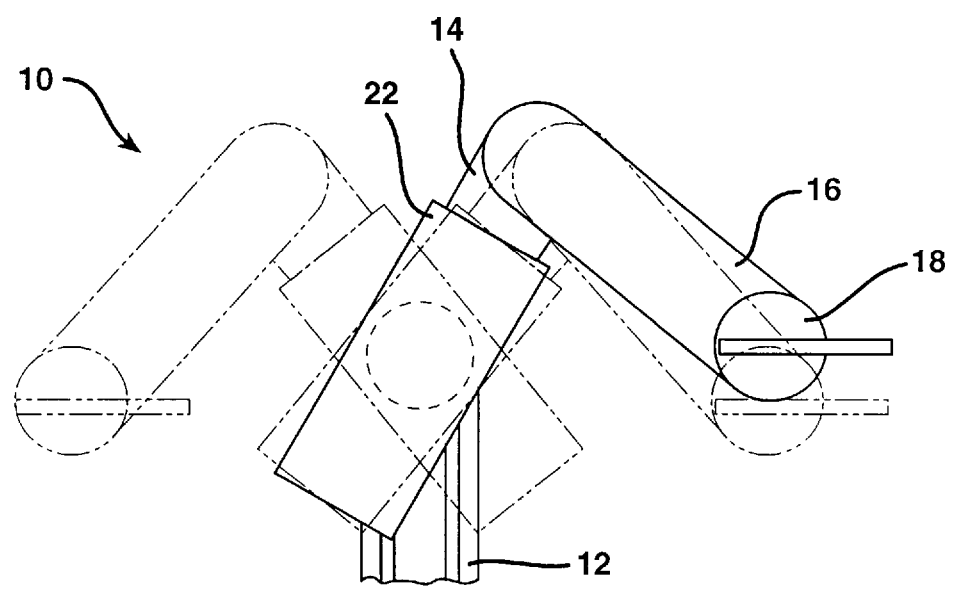
FIG. 6 is side elevational view of the manipulator arm of FIG. 1 showing the arm in various positional states.

As shown in FIG. 6, the workpiece holder or wrist 18 is maintained in a single rotary orientation regardless of the position or movement of the upper and lower arms 14, 16. Referring now to FIG. 3, the wrist 18 is maintained in the single rotary orientation via a cabling system 84. The cabling system 84 comprises a first pulley 86, a second pulley 88, a third pulley 90, a fourth pulley 92, a fifth pulley 94, a sixth pulley 96, a seventh pulley 98, an eighth pulley 100, a first cable 102, a second cable 104, a third cable 106 and a fourth cable 108. The first and second pulleys 86, 88 are coaxially aligned with the shoulder pivot 24 and rigidly coupled to the base 12 through the coupling housing 40. In the illustrated embodiment, the first and second pulleys 86, 88 are integral with each other. The first and second pulleys 86, 88 do not rotate and are referenced to the ground as they are fixed to the base 12.

The third and fourth pulleys 90, 92 are rotatably coupled to the second end 14b of the upper arm 14. The fifth and sixth pulleys 94, 96 are rotatably coupled to the first end 16a of the lower arm 16. The third, fourth, fifth and sixth pulleys 90, 92, 94, 96 are coaxially aligned with the elbow pivot 28 and fixed to each other through a coupling shaft 110. The coupling shaft 110 is positioned within the fifth drive shaft 62 and rotates independent of the same. The third, fourth, fifth and sixth pulleys 90, 92, 94, 96 are freely rotatably as a unit about the second axis 30. The third and fourth pulleys 90, 92 are split pulleys which may be rotated relative to one another and fixed in a desired position by three fasteners 112 (only one of which is shown). The fifth and sixth pulleys 94, 96 are integral with each other. The seventh and eighth pulleys 98, 100 are coaxially aligned with the wrist pivot 32 and fixed to the wrist 18. The seventh and eighth pulleys 98, 100 are split pulleys. The pulleys 86–100 are interconnected through the first, second, third and fourth cables 102, 104, 106, 108. The interaction between the cables and pulleys will be described with reference to FIGS. 4 and 5.

Figure 4:
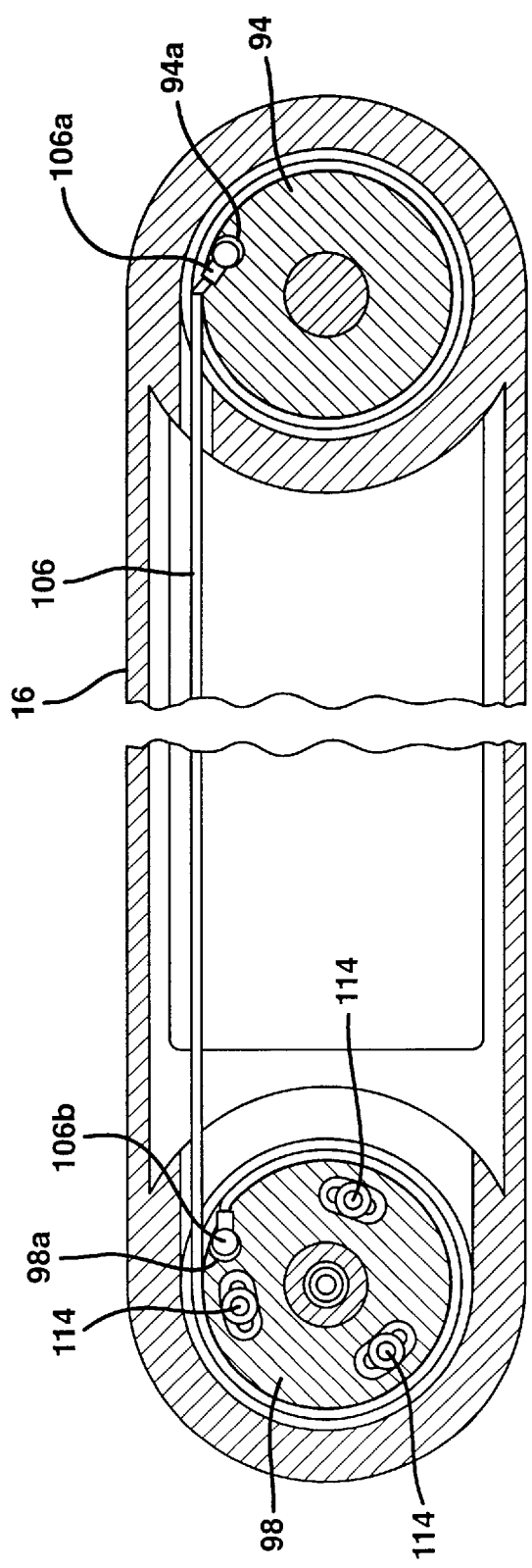
FIG. 4 is a sectional side view of a second arm of the manipulator arm taken along line 4—4 of FIG. 3.
Figure 5:
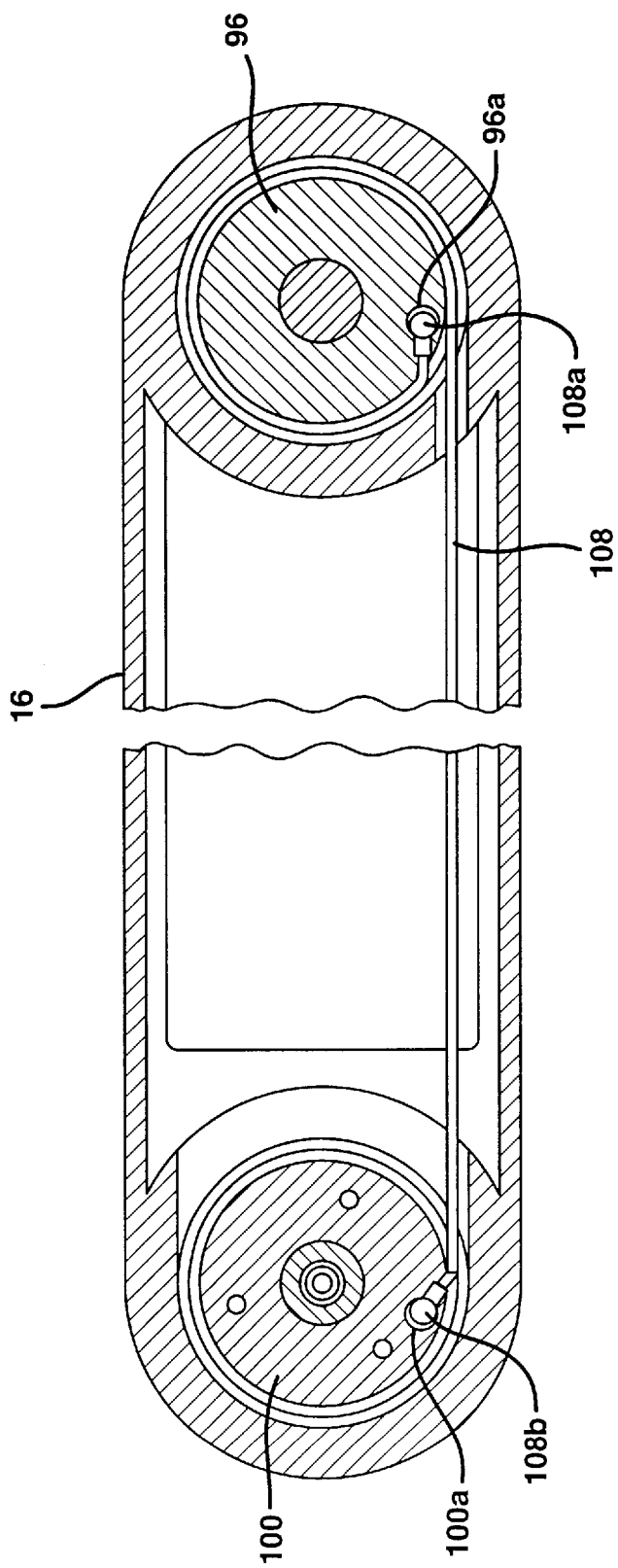
FIG. 5 is a sectional side view of the second arm of the manipulator arm taken along line 5—5 of FIG. 3.

FIGS. 4 and 5 show the interaction between the fifth, sixth, seventh, and eighth pulleys 94, 96, 98, 100 with the third and fourth cables 106, 108. Since the pulleys 86, 88, 90, 92 and the cables 102, 104 are arranged in the same manner, their interaction will be apparent and will not be described herein. As shown in FIG. 4, a first end 106a of the third cable 106 is coupled to the fifth pulley 94 through a notch 94a while a second end 106b of the third cable 106 is coupled to the seventh pulley 98 through a notch 98a. As shown in FIG. 5, a first end 108a of the fourth cable 108 is coupled to the sixth pulley 96 through a notch 96a while a second end 108b of the fourth cable 108 is coupled to the eighth pulley 100 through a notch 100a. The third cable 106 is arranged so that as the first end 106a is unwound from the fifth pulley 94, the second end 106b is wound around the seventh pulley 98. Conversely, the fourth cable 108 is arranged so that as the second end 108b is unwound from the eighth pulley 100, the first end 108a is wound around the sixth pulley 96.

The cabling system 84 is designed so that the cables 102, 104, 106, 108 cannot wrap around themselves. The configuration shown in FIGS. 4 and 5 shows the lower arm 16 at one end of its range of motion. The lower arm 16 cannot rotate any further in that direction, e.g. clockwise, since the cables 106, 108 are in their extreme positions. The lower arm 16 may be rotated in the opposite direction as the cables 106, 108 are wound and unwound from the respective pulleys. The cables 106, 108 move freely with the pulleys 94, 96, 98, 100 since their ends are coupled to the pulleys. Further, the cables 106, 108 will not slip as typically occurs with a single cable wrapped around two pulleys. Since the seventh and eighth pulleys 98, 100 are split pulleys, the tension of the third and fourth cables 106, 108 may be adjusted by rotating the seventh and eighth pulleys 98, 100 relative to one another and then fixing them in place by fastener 114.

Similarly, the first cable 102 is coupled to the first and third pulleys 86, 90 while the second cable 104 is coupled to the second and fourth pulleys 88, 92. The tension on the first and second cables 102, 104 may be adjusted via the split pulleys 90, 92. The first and second pulleys 86, 88 are secured to ground through the base 12 while the seventh and eighth pulleys 98, 100 are secured to the wrist 18. The other pulleys 90, 92, 94, 96 are free to rotate so that the wrist 18 is referenced to ground and maintained in a single rotary orientation regardless of the position or movement of the upper and lower arms 14, 16.

In the illustrated embodiment, the upper and lower arms 14, 16 each have a range of motion between 180 degrees and 330 degrees. As stated above, the cables are arranged so that as one end of a cable is wound around one pulley, the other end of the cable is unwound from another pulley. Preferably, the cables have a length such that no portion of any one of the cables is wrapped over another portion of that one cable as it would vary the effective radius of the pulley about which the pulley is wrapped. As such, a "dead spot" is introduced into the movement of both arms 14, 16. The "dead spot" is a set number of degrees, e.g. 30 degrees, in which the upper and/or lower arm 14, 16 may not further rotate. The location of the "dead spot" may be varied by adjusting the relative angular orientation of the pulleys. The "dead spot" for the upper arm 14 may be varied by adjusting the angular orientation of the pulleys 88,86 relative to the base 12. Similarly, the "dead spot" for the lower arm 16 may be varied by adjusting the angular orientation of the pulleys 94, 96 relative the pulleys 90, 92.

It should be noted that the representation of the upper and lower arms 14, 16 in FIG. 3 is for illustration purposes only and not a true representation of an actual position of the arms 14, 16. The first and second motors 20, 22 are commercially available servo motors having an encoder portion 20a, 22a, a brake portion 20b, 22b and a drive portion 20c, 22c, see FIGS. 2 and 3. The brake portion 20b, 22b is disengaged with the application of a control signal, for example a 90 volt dc signal in a working embodiment of the present invention. The control signal is applied to the brake portion 20b, 22b as long as each arm 14, 16 is within its defined range of motion.

The upper and lower arms 14, 16 are prevented from exceeding their respective defined range of motion by position sensors 118, 120, see FIGS. 1 and 3. The position sensor 120 for the second arm 16 includes an optical source 120a, an optical detector 120b and a sensor target 120c. The optical source 120*a* and the optical detector 120*b* are mounted to the upper arm 14 while the sensor target 120*c* is mounted to the lower arm 16.

As shown in FIG. 1, the sensor target 120*c* is configured so that it remains positioned between the optical source 120*a* and the optical detector 120*b* as long as the lower arm 16 is within its defined range of motion. If the lower arm 16 attempts to extend past its defined range of motion, the optical detector 120*b* will detect the light generated by the optical source 120*a* as the sensor target 120*c* exposes the optical detector 120*b*. The signal from the optical detector 120*b* is transmitted to a processor 121 which controls the manipulator device 10 including the first and second motors 20, 22. The processor 121 discontinues power to both the first and second motors 20, 22 and the brake portions 20*b*, 22*b* are engaged by removing the *90* volt control signal to the brake portions 20*b*, 22*b*. The brake portions 20*b*, 22*b* will remain engaged as long as the optical detector 120*b* receives the light generated by the optical source 120*a*. Further, the lower arm 16 must be moved back within its defined range of motion and a reset switch must be set before the processor 121 will apply power to the motors 20, 22 and disengage the brake portion 20*b*, 22*b* by applying the ninety volt signal.

The position sensor 118 for the upper arm 14 is configured in the same manner as the position sensor 120 for the lower arm 16 and thus will not be described herein. It will be appreciated by those skilled in the art that other types of position sensors may be used without departing from the scope of the present invention.

Figure 7:
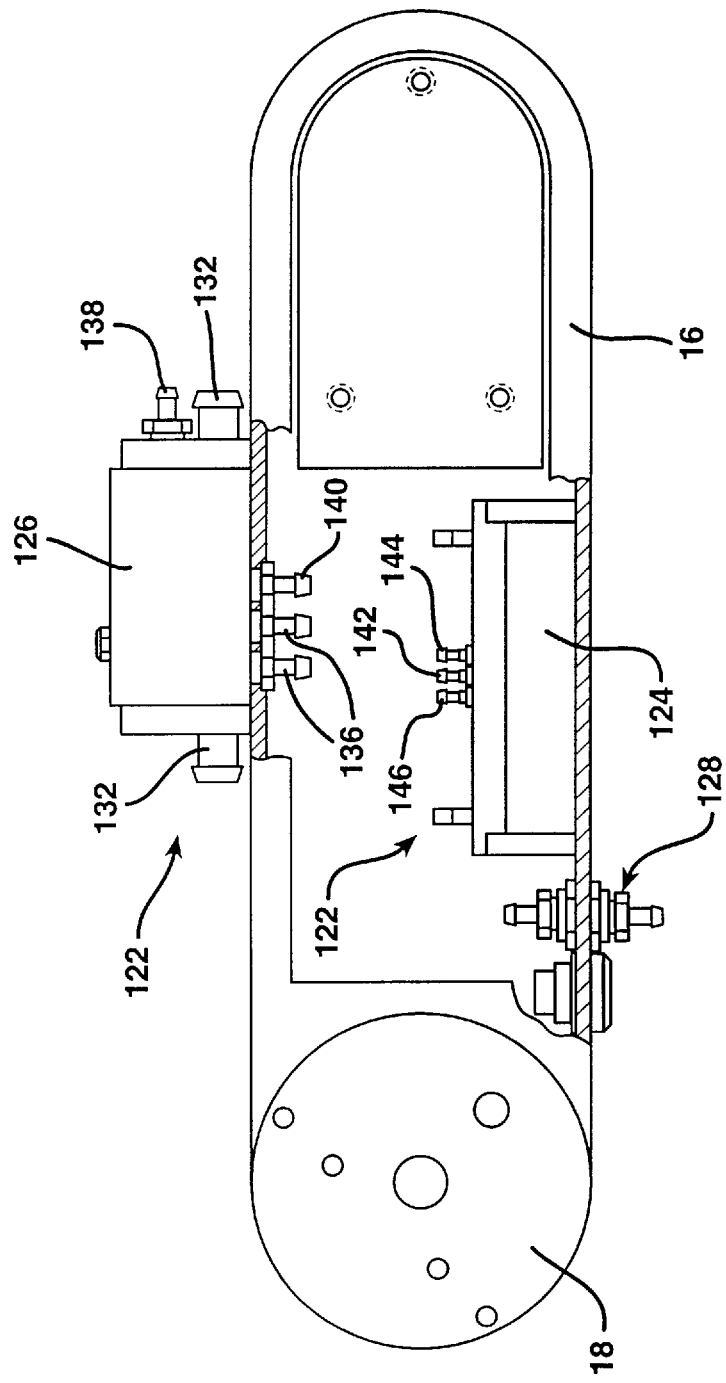
FIG. 7 is a sectional side view of the second arm of the manipulator arm taken along line 7—7 of FIG. 3.

A variety of tools may be coupled to the wrist 18 for performing desired tasks. A gripper device as disclosed in copending application, U.S. Ser. No. 08/719,170, entitled "AN APPARATUS FOR IMPARTING ROTARY MOTION TO TOOLING" by Kuhl et al., herein incorporated by reference, may be used to transport computer disks from one work station to another. In the illustrated embodiment of FIG. 7, the lower arm 16 includes a valve assembly 122 for interfacing with the desired tool and a vacuum/air supply. The valve assembly 122 includes a solenoid valve assembly 124, a valve pack 126 and a pair of interconnections 128 (only one shown). As shown in FIG. 3, the valve pack 126 includes a pair of vacuum input lines 132 (only one shown in FIG. 7) which are connected to a pair of vacuum output lines 134 (only one shown in FIG. 7). The vacuum input lines 132 are coupled to a vacuum pump (not shown) while the output lines 134 are coupled to the gripper device. Referring to FIG. 7, the valve pack 126 includes a pair of air actuated pistons (not shown) for controlling the vacuum between the vacuum input and output lines 132, 134. The air actuated pistons are controlled via a pair of input air lines 136, one for each piston. The valve pack 126 includes an air input connection 138 which is coupled to an air source (not shown). The air input connection 138 is directly connected to an air output connection 140.

The air output connection 140 is connected to an air input connection 142 of the solenoid valve assembly 124. The solenoid valve assembly 124 includes four output air supply connections 144, 146 (only two shown). The solenoid valve assembly 124 controls each of the output air supply connections independently. Two of the connections are fed back to the air input lines 136 of the valve pack 126. The solenoid valve assembly 124 therefore controls the air actuated pistons. The other two output air supply connections are connected to the pair of interconnections 128 which are connected to the gripper tool. The solenoid valve assembly 124 controls the gripper through the control of the air supplied to the gripper. The solenoid valve assembly 124 is itself controlled by the processor 121 of the manipulator device 10. It will be appreciated by those skilled in the art that other air/vacuum connections may be made depending on the desired tool and the action required therefrom.

The second motor 22 is positioned along the upper arm 14 so that it acts as a counterweight for loads applied to the lower arm 16 and the wrist 18. As shown in FIG. 1, the first motor 20 drives the upper and lower arms 14, 16 about the shoulder pivot 24. The equivalent weight of the upper arm 14, the lower arm 16, the wrist 18, tooling and workpieces is positioned on one side of the shoulder pivot 24, i.e. towards the lower arm 16. The first motor 20 drives the equivalent weight about the shoulder pivot 24. The power requirements for driving such a weight may be reduced by adding a counterweight to the other side of the shoulder pivot 24.

The brake portion 22*b* of the second motor 22 is a heavy portion of the second motor 22. As shown in FIG. 3, the encoder portion 22*a*, the brake portion 22*b* and part of the drive portion 22*c* are positioned on the other side of the shoulder pivot 24. The second motor 22 therefore acts as a counterweight for the equivalent weight of the above components. Thus, the second motor 22 has a dual function of driving the lower arm 16 as described above and acting as a counterweight for the upper arm 14. Adding a counterweight to the other side of the shoulder pivot 24 increases the load which may be driven by the first motor 20 and/or reduces the size of the motor required to drive such a load.

The present invention has been described with respect to the manipulator device 10 which is rigidly coupled to an immovable base 12. However, it will be appreciated by those skilled in the art that the base 12 may be rotatably coupled to another stationary object so that the manipulator device 10 may be rotated about a vertical axis. Also, the manipulator device 10 may be coupled to other movable devices as required for a given application. It should be apparent that the manipulator device 10 of the present invention is simple to construct compared to prior art manipulator devices.

Figure 8:
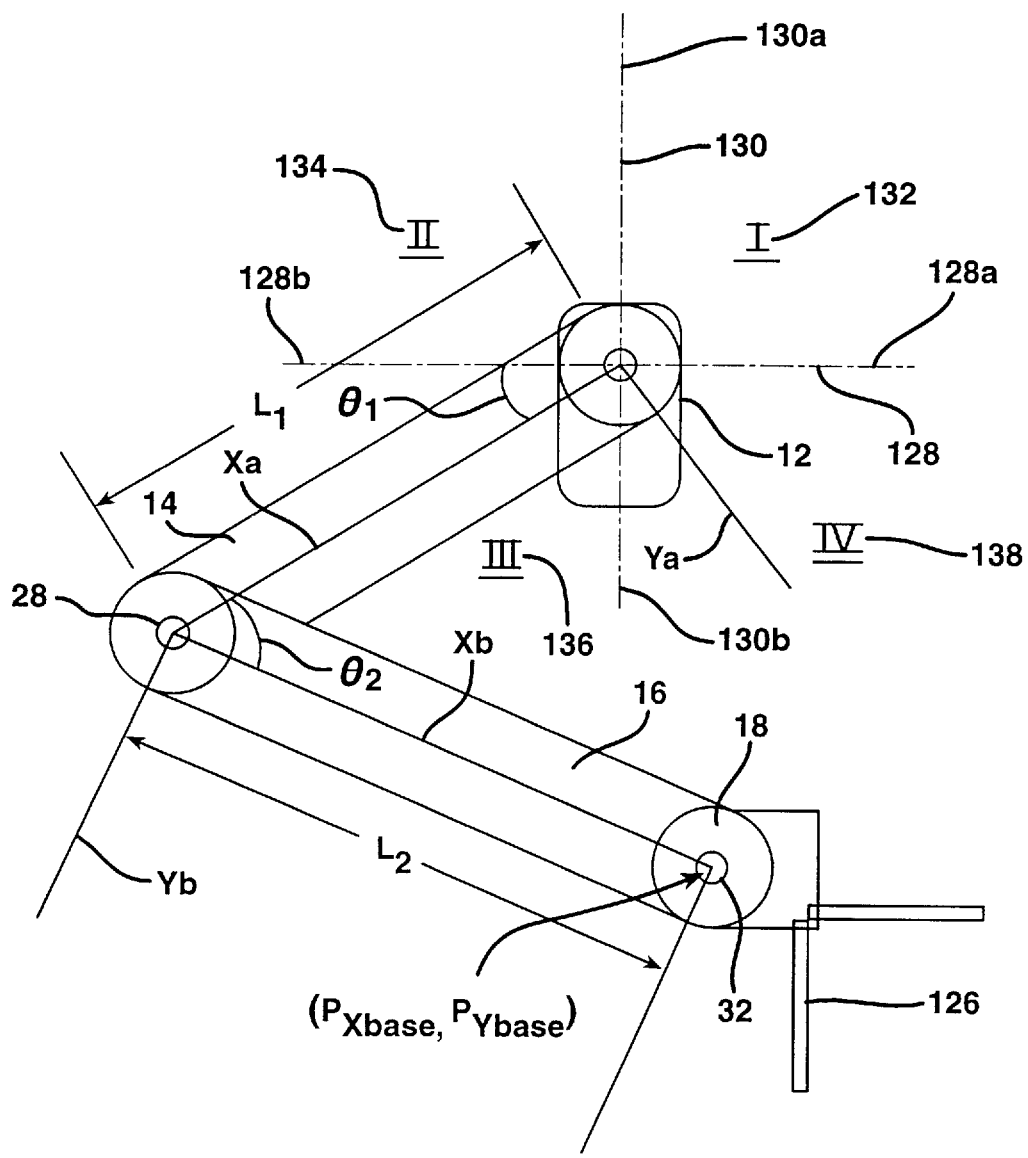
FIG. 8 is a side schematic view of the manipulator arm of FIG. 1 in a first position.

Referring now to FIG. 8, the upper arm 14 has a first length $L_1$ and the lower arm 16 has a second length $L_2$. The first length $L_1$ is defined as the distance from the shoulder pivot 24 to the elbow pivot 28 while the second length $L_2$ is defined as the distance from the elbow pivot 28 to the wrist pivot 32. As should be apparent from FIG. 8, the first length $L_1$ is different from the second length $L_2$ as the lower arm 16 is longer than the upper arm 14. Since the lower arm 16 is longer than the upper arm 14, the manipulator device 10 is able to move tooling and associated workpieces within an enclosure (not shown) in which the horizontal dimensions are greater than the vertical dimensions without the upper arm 14 contacting a floor or ceiling portion of the enclosure when the arms 14 and 16 are moved to their retracted-most position.

As shown in FIG. 8, a tool 127, shown schematically, is coupled to the wrist 18. It is desirable to be able to move the tool 127 linearly within a defined work space. A two axis coordinate system is defined which establishes a set of reference points within the defined work space. The base 12 of the manipulator device 10 is positioned at the intersection of a first or X-axis 129 and a second or Y-axis 130 which comprise the two axes of the coordinate system. The X-axis 129 is substantially perpendicular to the Y-axis 130. The two axis coordinate system includes a first quadrant 131, a second quadrant 133, a third quadrant 135 and a fourth quadrant 137. The first quadrant 131 is defined by a positive portion 129a of the X-axis 129 and a positive portion 130a of the Y-axis 130 and includes points having coordinates along those portions 128a and 130a. The second quadrant 133 is defined by a negative portion 129b of the X-axis 129 and the positive portion 130a of the Y-axis 130. The third quadrant 135 is defined by the negative portion 129b of the X-axis 129 and a negative portion 130b of the Y-axis 130. The fourth quadrant 139 is defined by the positive portion 129a of the X-axis 129 and the negative portion 130b of the Y-axis 130. It will be appreciated by those skilled in the art that the two axis coordinate system may be defined in other reasonable configurations. The position of the tool 127 is referenced within the two axis coordinate system with respect to the wrist pivot 32.

Once the two axis coordinate system is established, a local axis system must be established for each of the arms 14, 16. As shown in FIG. 8, the local axis system for the upper arm 14 includes an axis Xa which extends along a substantially straight line extending between the shoulder pivot 24 and the elbow pivot 28 and an axis Ya which is substantially orthogonal to the axis Xa. The local axis system for the lower arm 16 includes an axis Xb which extends along a substantially straight line extending between the elbow pivot 28 and the wrist pivot 32 and an axis Yb which is substantially orthogonal to the axis Xb. While the two axis coordinate system remains fixed, the local axis systems rotate as the upper and lower arms 14, 16 rotate.

The position of the wrist pivot 32 within the two axis coordinate system is determined with respect to the relative angular positions of the upper and lower arms 14, 16. A first angular position $\theta_1$ of the upper arm 14 is defined by the angle extending between the X-axis 129 and the local axis Xa of the upper arm 14; see FIG. 8. A second angular position $\theta_2$ of the lower arm 16 is defined as the angle between the local axis Xa of the upper arm 14 and the local axis Xb of the lower arm 16.

Once a position $P_{Xbase}$ and $P_{Ybase}$ of the wrist pivot 32 is known, the processor 121 may calculate the first and second angular positions $\theta_1$, $\theta_2$ of the upper and lower arms 14, 16. The equations to calculate the first and second angular positions $\theta_1$, $\theta_2$ are dependent upon the quadrant in which the wrist pivot 32 is located. If the wrist pivot 32, and hence $P_{Xbase}$ and $P_{Ybase}$ is located in either the second quadrant 133 or the third quadrant 135, the following equations are used to calculate the first and second angular positions $\theta_1$, $\theta_2$:

$$\theta_1 = \pi - \cos^{-1}\left(\frac{L_2^2 - L_1^2 - P_{Xbase}^2 - P_{Ybase}^2}{-2L_1\sqrt{P_{Xbase}^2 + P_{Ybase}^2}}\right) + \sin^{-1}\left(\frac{P_{Ybase}}{\sqrt{P_{Xbase}^2 + P_{Ybase}^2}}\right) \quad (1)$$

$$\theta_2 = \pi - \cos^{-1}\left(\frac{L_1^2 + L_2^2 - (P_{Xbase}^2 + P_{Ybase}^2)}{2L_1^2 L_2^2}\right) \quad (2)$$

where:
$\theta_1$ defines the first angular position of the upper arm 14 and is an angle between the X-axis 129 and the local axis Xa along the upper arm 14;
$\theta_2$ defines the second angular position of the lower arm 16 and is an angle between the local axis Xb along the lower arm 16 and the local axis Xa along the upper arm 14;
$L_1$ is the first length of the upper arm 14;
$L_2$ is said second length of the lower arm 16;
$P_{Xbase}$ is the X-axis coordinate of the position of the wrist pivot 32; and
$P_{Ybase}$ is the Y-axis coordinate of the position of the wrist pivot 32.

If the wrist pivot 32, and hence $P_{Xbase}$ and $P_{Ybase}$, is located in either the first quadrant 131 or the fourth quadrant 137, the following equations are used to calculate the first and second angular positions $\theta_1$, $\theta_2$:

$$\theta_1 = 2\pi - \cos^{-1}\left(\frac{L_2^2 - L_1^2 - P_{Xbase}^2 - P_{Ybase}^2}{-2L_1\sqrt{P_{Xbase}^2 + P_{Ybase}^2}}\right) + \sin^{-1}\left(\frac{P_{Ybase}}{\sqrt{P_{Xbase}^2 + P_{Ybase}^2}}\right) \quad (3)$$

$$\theta_2 = \pi - \cos^{-1}\left(\frac{L_1^2 + L_2^2 - (P_{Xbase}^2 + P_{Ybase}^2)}{2L_1^2 L_2^2}\right) \quad (4)$$

where:
$\theta_1$ defines the first angular position of the upper arm 14 and is an angle between the X-axis 129 and the local axis Xa along the upper arm 14;
$\theta_2$ defines the second angular position of the lower arm 16 and is an angle between the local axis Xb along the lower arm 16 and the local axis Xa along the upper arm 14;
$L_1$ is the first length of said upper arm 14;
$L_2$ is said second length of said lower arm 16;
$P_{Xbase}$ is the X-axis coordinate of the position of the wrist pivot 32; and
$P_{Ybase}$ is the Y-axis coordinate of the position of the wrist pivot 32.

As stated above, the first and second motors 20, 22 include encoder portions 20a, 22a. The encoder portions 20a, 22a are absolute encoders such that the processor 121 always knows the position of the upper and lower arms 14, 16 based on the output of the encoder portions 20a, 22a.

During set-up, an operator defines end points of a straight line path along which the wrist pivot 32, and hence, the tooling 127, is to move. As noted above, the tooling 127 always remains in single rotary orientation regardless of the position or movement of the arms 14 and 16 via the cabling system 84.

Figure 9:
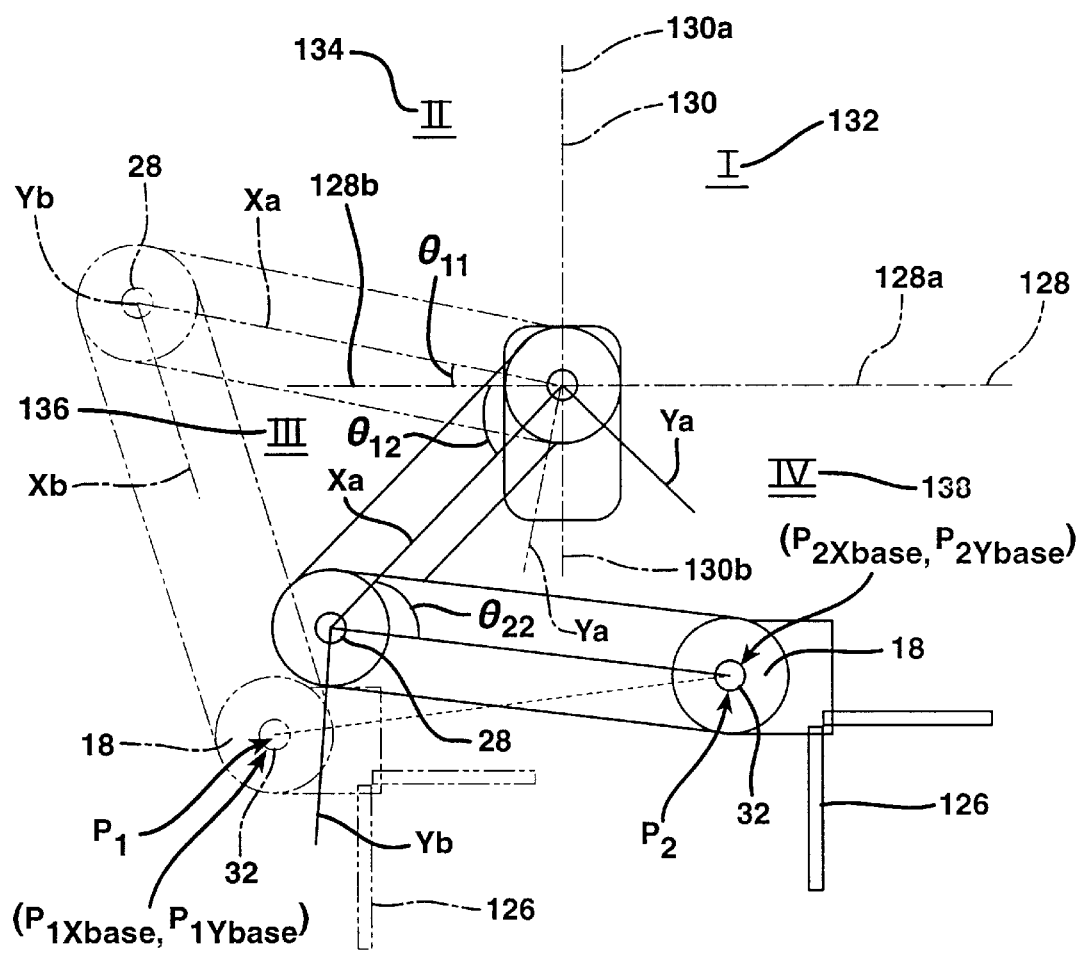
FIG. 9 is a side schematic view of the manipulator arm of FIG. 1 showing the arm in solid line in a one position and in phantom in another position.

During set-up, the operator jogs or moves the wrist pivot 32 via control keys located on a control keypad or keyboard 300 associated with the processor 121 so as to move the wrist pivot 32 to a first point $P_1$ having coordinates $P_{1Xbase}$, $P_{1Ybase}$, see FIG. 9. The operator then hits a record key (not shown) on the keyboard 300 such that the processor 121 stores the first and second angular positions $\theta_1$, $\theta_2$ of the first and second arms 14, 16 when the wrist pivot 32 is at the first point $P_1$. The operator then moves the wrist pivot 32 to a desired second point $P_2$ having coordinates $P_{2Xbase}$, $P_{2Ybase}$. The operator then hits the record key again such that the processor 121 stores the first and second angular positions $\theta_1$, $\theta_2$ of the first and second arms 14, 16 when the wrist pivot 32 is at the second point $P_2$. Additional straight-line paths may also be defined in the same manner during the set-up operation such that the wrist pivot 32 moves sequentially along a plurality of substantially straight-line paths.

After set-up has been completed and during operation of the manipulator device 10, the processor 121 causes the upper and lower arms 14, 16 to move in such a manner so that the wrist pivot 32 is moved linearly between the first point P₁ and the second point P₂. In order to effect straight-line movement, the processor 121 first separates the linear path extending between the first point P₁ and the second point P₂ into discrete segments. In the illustrated embodiment, the length of each segment depends upon the velocity at which the wrist pivot 32 moves as the processor 121 defines a new segment every 1 millisecond. Of course, this time period can be varied. As should be apparent, the slower the speed the greater the number of segments which translates into a more accurate linear motion between the two points P₁ and P₂. Alternatively, the processor 121 can be programmed such that the segments have a predefined length which does not vary with the velocity of the wrist pivot 32.

The position of wrist pivot 32 at an end point of each segment represents another point having coordinates $P_{Xbase}$, $P_{Ybase}$ within the two axis coordinate system. Each segment end point comprises an intermediate point along the linear path. The first and second angular positions $\theta_1$, $\theta_2$ for the first and second arms 14, 16 when the wrist pivot 32 is at each segment end point are calculated by the processor 121 using equations (1) through (4) set out above. These calculations are made by the processor 121 for each segment end point each time the wrist pivot 32 is moved along the linear path. Hence, for a given segment end point, the processor 121 will calculate first and second angular positions $\theta_1$, $\theta_2$ at which the first and second arms 14, 16 should be moved so that the wrist pivot 32 is moved to that segment end point. Based upon the calculated first and second angular positions $\theta_1$, $\theta_2$ for each segment end point, the processor 121 controls the first and second motors 20, 22 to rotate the upper and lower arms 14, 16 so as to move the wrist pivot 32 along the substantially linear path. The processor 121 continues this process for each segment end point until the wrist pivot 32 is located at the second point P₂. Accordingly, the processor 121 calculates the first and second angular positions $\theta_1$, $\theta_2$ for each segment end point during movement of the upper and lower arms 14, 16. Alternatively, the first and second angular positions $\theta_1$, $\theta_2$ for each segment end point may be pre-calculated and stored in the processor 121.

The processor 121 may display the position of the wrist pivot 32 on a display (not shown) at any point along the linear path. Once the exact first and second angular positions $\theta_1$, $\theta_2$ of the first and second arms 14, 16 are determined, the processor 121 calculates the position of the wrist pivot 32 based upon the following equations:

$$P_{Xbase} = (L_1 \cos\theta_1) + (L_2 \cos(\theta_1 - \theta_2))$$

$$P_{Ybase} = (L_1 \sin\theta_1) + (L_2 \sin(\theta_1 - \theta_2))$$

where:

$P_{Xbase}$ is the X-axis coordinate of the position of the wrist pivot 32;

$P_{Ybase}$ is the Y-axis coordinate of the position of the wrist pivot 32;

$\theta_1$ defines the first angular position of the upper arm 14 and is an angle between the upper arm 14 and the X-axis 129;

$\theta_2$ defines the second angular position of the lower arm 16 and is an angle between the lower arm 16 and the upper arm 14;

$L_1$ is the first length of the upper arm 14; and $L_2$ is the second length of the lower arm 16.

It will be appreciated by those skilled in the art that there is a natural "dead spot" near the intersection of the X- and Y-axes 129, 130 or origin of the two axis coordinate system. The size of the "dead spot" is dependent on the difference in lengths of the upper and lower arms 14, 16, i.e. the greater the difference, the greater the "dead spot." Accordingly, linear movement of the wrist pivot 32 through the "dead spot" is not possible.

Having described the invention in detail and by reference to preferred embodiments thereof, it will be apparent that modifications and variations are possible without departing from the scope of the invention which is defined in the appended claims.

What is claimed is:

1. An apparatus for imparting linear motion to tooling, said apparatus comprising:

a base;

a first arm of a first length having a first end and a second end, said first end of said first arm being pivotally coupled to said base so as to rotate about a first axis;

a second arm of a second length different from said first length having a first end and a second end, said first end of said second arm being pivotally coupled to said second end of said first arm so as to rotate about a second axis, said second end of said second arm coupled to said tooling;

a drive mechanism for imparting rotary motion to said first and second arms; and a processor for controlling said drive mechanism so as to move said tooling substantially linearly from a first end point to a second end point, said processor being programmed to:

control said drive mechanism so as to adjust a first angular position of said first arm with respect to an X-axis of a two axis coordinate system, said two axis coordinate system comprising a Y-axis substantially orthogonal to said X-axis thereby forming a first quadrant, a second quadrant, a third quadrant and a fourth quadrant, said X-axis and said Y-axis intersecting said base;

control said drive mechanism so as to adjust a second angular position of said second arm with respect to said first arm;

determine said first and second angular positions for said first and second arms for each of a plurality of intermediate points along which said tooling passes as it travels along a substantially straight line extending between said first and second end points;

wherein said first angular position and said second angular position with said tooling at one of said intermediate points along said substantially straight line extending between said first and second points and being located within one of said second and third quadrants are determined by:

$$\theta_1 = \pi - \cos^{-1}\left(\frac{L_2^2 - L_1^2 - P_{Xbase}^2 - P_{Ybase}^2}{-2L_1\sqrt{P_{Xbase}^2 + P_{Ybase}^2}}\right) + \sin^{-1}\left(\frac{P_{Ybase}}{\sqrt{P_{Xbase}^2 + P_{Ybase}^2}}\right)$$

$$\theta_2 = \pi - \cos^{-1}\left(\frac{L_1^2 + L_2^2 - (P_{Xbase}^2 + P_{Ybase}^2)}{2L_1^2 L_2^2}\right)$$

wherein:

$\theta_1$ defines said first angular position of said first arm and is an angle between said first arm and said X-axis;

$\theta_2$ defines said second angular position of said second arm and is an angle between said second arm and said first arm;

$L_1$ is said first length of said first arm;

$L_2$ is said second length of said second arm;

$P_{Xbase}$ is a first axis coordinate of said one intermediate point; and $P_{Ybase}$ is a second axis coordinate of said one intermediate point.

2. The apparatus as set forth in claim 1, wherein said drive mechanism comprises a first motor for imparting rotary motion to said first arm and a second motor for imparting rotary motion to said second arm.

3. The apparatus as set forth in claim 1, further comprising a cabling system coupled to said first and second arms so that said tooling is maintained in a first angular position regardless of movement of said first and second arms.

4. The apparatus as set forth in claim 1, wherein said first angular position and said second angular position with said tooling at another of said intermediate points along said substantially straight line extended between said first and second points and being located within one of said first and fourth quadrants are determined by:

$$\theta_{1_a} = 2\pi - \cos^{-1}\left(\frac{L_2^2 - L_1^2 - P_{Xbase_a}^2 - P_{Ybase_a}^2}{-2L_1\sqrt{P_{Xbase_a}^2 + P_{Ybase_a}^2}}\right) +$$

$$\sin^{-1}\left(\frac{P_{Ybase_a}}{\sqrt{P_{Xbase_a}^2 + P_{Ybase_a}^2}}\right)$$

$$\theta_{2_a} = \pi - \cos^{-1}\left(\frac{L_1^2 + L_2^2 - (P_{Xbase_a}^2 + P_{Ybase_a}^2)}{2L_1^2 L_2^2}\right)$$

wherein:

$\theta_{1_a}$ defines said first angular position of said first arm with said tooling at said another point and is an angle between said first arm and said X-axis;

$\theta_{2_a}$ defines said second angular position of said second arm with said tooling at said another point and is an angle between said second arm and said first arm;

$L_1$ is said first length of said first arm;

$L_2$ is said second length of said second arm;

$P_{Xbase\ a}$ is a first axis coordinate of said another intermediate point; and $P_{Ybase\ a}$ is a second axis coordinate of said another intermediate point.

5. The apparatus as set forth in claim 4, wherein said drive mechanism comprises a first motor for imparting rotary motion to said first arm and a second motor for imparting rotary motion to said second arm.

6. The apparatus as set forth in claim 4, further comprising a cabling system coupled to said first and second arms so that said tooling is maintained in a first angular position regardless of movement of said first and second arms.

7. A process for imparting linear motion to tooling coupled to an apparatus, said apparatus comprises a base; a first arm of a first length having a first end and a second end, said first end of said first arm being pivotally coupled to said base so as to rotate about a first axis; a second arm of a second length different from said first length having a first end and a second end, said first end of said second arm being pivotally coupled to said second end of said first arm so as to rotate about a second axis; said process comprising the steps of:

providing a drive mechanism for imparting rotary motion to said first and second arms;

controlling said drive mechanism so as to move said tooling substantially linearly from a first end point to a second end point by:

determining a first angular position of said first arm with respect to an X-axis of a two axis coordinate system for each of a plurality of intermediate points along which said tooling passes as it travels along a substantially straight line extending between said first and second end points, said two axis coordinate system comprising a Y-axis substantially orthogonal to said X-axis thereby forming a first quadrant, a second quadrant, a third quadrant and a fourth quadrant, said X-axis and said Y-axis intersecting said base; and determining a second angular position of said second arm with respect to said first arm for each of said plurality of intermediate points;

wherein said first and second angular positions for one of said plurality of intermediate points which is located within one of said second and third quadrants are determined by:

$$\theta_1 = \pi - \cos^{-1}\left(\frac{L_2^2 - L_1^2 - P_{Xbase}^2 - P_{Ybase}^2}{-2L_1\sqrt{P_{Xbase}^2 + P_{Ybase}^2}}\right) +$$

$$\sin^{-1}\left(\frac{P_{Ybase}}{\sqrt{P_{Xbase}^2 + P_{Ybase}^2}}\right)$$

$$\theta_2 = \pi - \cos^{-1}\left(\frac{L_1^2 + L_2^2 - (P_{Xbase}^2 + P_{Ybase}^2)}{2L_1^2 L_2^2}\right)$$

wherein:

$\theta_1$ defines said first angular position of said first arm and is an angle between said first arm and said X-axis;

$\theta_2$ defines said second angular position of said second arm and is an angle between said second arm and said first arm;

$L_1$ is said first length of said first arm;

$L_2$ is said second length of said second arm;

$P_{Xbase}$ is a first axis coordinate of said one intermediate point; and $P_{Ybase}$ is a second axis coordinate of said one intermediate point.

8. The process as set forth in claim 7, and wherein said first and second angular positions for another of said plurality of intermediate points which is located within one of said first and fourth quadrants are determined by:

$$\theta_{1_a} = 2\pi - \cos^{-1}\left(\frac{L_2^2 - L_1^2 - P_{Xbase_a}^2 - P_{Ybase_a}^2}{-2L_1\sqrt{P_{Xbase_a}^2 + P_{Ybase_a}^2}}\right) +$$

-continued $$\theta_{2_a} = \pi - \cos^{-1}\left(\frac{L_1^2 + L_2^2 - (P_{Xbase_a}^2 + P_{Ybase_a}^2)}{2L_1^2 L_2^2}\right)$$

$$\sin^{-1}\left(\frac{P_{Ybase_a}}{\sqrt{P_{Xbase_a}^2 + P_{Ybase_a}^2}}\right)$$

wherein:
- $\theta_{1_a}$ defines said first angular position of said first arm with said tooling at said another point and is an angle between said first arm and said X-axis;
- $\theta_{2_a}$ defines said second angular position of said second arm with said tooling at said another point and is an angle between said second arm and said first arm;
- $L_1$ is said first length of said first arm;
- $L_2$ is said second length of said second arm;
- $P_{Xbase\ a}$ is a first axis coordinate of said another intermediate point; and
- $P_{Ybase\ a}$ is a second axis coordinate of said another intermediate point.

9. The process as set forth in claim 7, further comprising the step of:
   providing a cabling system coupled to said first and second arms so that said tooling is maintained in a first angular position regardless of movement of said first and second arms.

10. The process as set forth in claim 8, further comprising the step of:
   providing a cabling system coupled to said first and second arms so that said tooling is maintained in a first angular position regardless of movement of said first and second arms.

11. An apparatus for imparting linear motion to tooling, said apparatus comprising:
   a base;
   a first arm of a first length having a first end and a second end, said first end of said first arm being pivotally coupled to said base so as to rotate about a first axis;
   a second arm of a second length different from said first length having a first end and a second end, said first end of said second arm being pivotally coupled to said second end of said first arm so as to rotate about a second axis, said second end of said second arm coupled to said tooling;
   a first motor for imparting rotary motion to said first arm;
   a second motor for imparting rotary motion to said second arm;
   a cabling system coupled to said first and second arms so that said tooling is maintained in a first angular position regardless of movement of said first and second arms; and
   a processor for controlling said first and second motors so as to move said tooling substantially linearly from a first end point to a second end point, said processor being programmed to:
      control said first motor so as to adjust a first angular position of said first arm with respect to an X-axis of a two axis coordinate system, said two axis coordinate system comprising a Y-axis substantially orthogonal to said X-axis thereby forming a first quadrant, a second quadrant, a third quadrant and a fourth quadrant, said X-axis and said Y-axis intersecting said base;
      control said second motor so as to adjust a second angular position of said second arm with respect to said first arm;
      determine said first and second angular positions for said first and second arms for each of a plurality of intermediate points along which said tooling passes as it travels along a substantially straight line extending between said first and second end points;
   wherein said first angular position and said second angular position with said tooling at one of said intermediate points along said substantially straight line extending between said first and second points and being located within one of said second and third quadrants are determined by:

$$\theta_1 = \pi - \cos^{-1}\left(\frac{L_2^2 - L_1^2 - P_{Xbase}^2 - P_{Ybase}^2}{-2L_1\sqrt{P_{Xbase}^2 + P_{Ybase}^2}}\right) +$$

$$\sin^{-1}\left(\frac{P_{Ybase}}{\sqrt{P_{Xbase}^2 + P_{Ybase}^2}}\right)$$

$$\theta_2 = \pi - \cos^{-1}\left(\frac{L_1^2 + L_2^2 - (P_{Xbase}^2 + P_{Ybase}^2)}{2L_1^2 L_2^2}\right)$$

wherein:
- $\theta_1$ defines said first angular position of said first arm and is an angle between said first arm and said X-axis;
- $\theta_2$ defines said second angular position of said second arm and is an angle between said second arm and said first arm;
- $L_1$ is said first length of said first arm;
- $L_2$ is said second length of said second arm;
- $P_{Xbase}$ is a first axis coordinate of said one intermediate point; and
- $P_{Ybase}$ is a second axis coordinate of said one intermediate point;

and wherein said first angular position and said second angular position with said tooling at another of said intermediate points along said substantially straight line extended between said first and second points and being located within one of said first and fourth quadrants are determined by:

$$\theta_{1_a} = 2\pi - \cos^{-1}\left(\frac{L_2^2 - L_1^2 - P_{Xbase_a}^2 - P_{Ybase_a}^2}{-2L_1\sqrt{P_{Xbase_a}^2 + P_{Ybase_a}^2}}\right) +$$

$$\sin^{-1}\left(\frac{P_{Ybase_a}}{\sqrt{P_{Xbase_a}^2 + P_{Ybase_a}^2}}\right)$$

$$\theta_{2_a} = \pi - \cos^{-1}\left(\frac{L_1^2 + L_2^2 - (P_{Xbase_a}^2 + P_{Ybase_a}^2)}{2L_1^2 L_2^2}\right)$$

wherein:
- $\theta_{1_a}$ defines said first angular position of said first arm with said tooling at said another point and is an angle between said first arm and said X-axis;
- $\theta_{2_a}$ defines said second angular position of said second arm with said tooling at said another point and is an angle between said second arm and said first arm;

$L_1$ is said first length of said first arm;

$L_2$ is said second length of said second arm;

$P_{Xbase\ a}$ is a first axis coordinate of said another intermediate point; and $P_{Ybase\ a}$ is a second axis coordinate of said another intermediate point.

* * * * *